United States Patent
Stoller et al.

(10) Patent No.: US 8,431,107 B2
(45) Date of Patent: Apr. 30, 2013

(54) METHOD FOR PRODUCING AMMONIUM HEPTAMOLYBDATE

(75) Inventors: Viktor Stoller, Bad Harzburg (DE); Michael Erb, Salzgitter (DE); Juliane Meese-Marktscheffel, Goslar (DE); Benno Decker, Bad Harzburg (DE)

(73) Assignee: H.C. Starck GmbH (DE)

( * ) Notice: Subject to any disclaimer, the term of this patent is extended or adjusted under 35 U.S.C. 154(b) by 756 days.

(21) Appl. No.: 12/524,976

(22) PCT Filed: Jan. 29, 2008

(86) PCT No.: PCT/EP2008/050991
§ 371 (c)(1),
(2), (4) Date: Aug. 19, 2009

(87) PCT Pub. No.: WO2008/092835
PCT Pub. Date: Aug. 7, 2008

(65) Prior Publication Data
US 2010/0008846 A1  Jan. 14, 2010

(30) Foreign Application Priority Data
Feb. 2, 2007  (DE) .................. 10 2007 005 285

(51) Int. Cl.
C01G 39/02 (2006.01)
(52) U.S. Cl.
USPC ........... 423/593.1; 23/297; 23/302 A; 423/54; 423/56
(58) Field of Classification Search .............. 423/56, 423/54, 58, 593, 593.1; 23/297, 303 A, 296, 23/305 R
See application file for complete search history.

(56) References Cited

U.S. PATENT DOCUMENTS 3,357,821 A * 12/1967 Henrickson .................. 423/54
3,458,277 A    7/1969 Platzke et al.
3,576,595 A *  4/1971 Chiola et al. ................. 423/54
4,079,116 A *  3/1978 Ronzio et al. ................ 423/56

FOREIGN PATENT DOCUMENTS

DE  2801067 A1     7/1979
DE  2801067 A1 *   7/1979
GB  1453225       10/1976
SU  1723042 A1     3/1992

OTHER PUBLICATIONS

U.S. Appl. No. 12/524,968, filed Jul. 29, 2009, Viktor Stoller et al.
U.S. Appl. No. 12/524,957, filed Jul. 29, 2009, Viktor Stoller et al.
MacInnis, et al. "The use of solvent extraction for the production and recovery of high-purity ammonium paramolybdate from normal alkali molybdate solution". Journal of the Less-Common Metals, 1974, vol. 36, pp. 11-116.
Skobeev, et al., "Production of ammonium paramolybdate from non-standard molybdenite concentrates by extraction", 1972.

* cited by examiner

*Primary Examiner* — Wayne Langel
*Assistant Examiner* — Syed Iqbal
(74) *Attorney, Agent, or Firm* — Novak Druce Connolly Bove + Quigg LLP

(57) ABSTRACT

A method for preparing ammonium heptamolybdate with the steps of:
  i) adding a molybdenum-containing organic phase to a liquid-liquid reextraction apparatus or to a desorption apparatus, and
  ii) directly cold-crystallization ammonium heptamolybdate by cooling the resulting reextraction or desorption solution.

15 Claims, 3 Drawing Sheets

METHOD FOR PRODUCING AMMONIUM HEPTAMOLYBDATE

CROSS-REFERENCE TO RELATED APPLICATIONS

Related Applications

This application is a national stage application (under 35 U.S.C. §371) of PCT/EP2008/050991, filed Jan. 29, 2008, which claims benefit of German application 102007005285.7, filed Feb. 2, 2007.

BACKGROUND OF THE INVENTION

The invention relates to a novel process for preparing ammonium heptamolybdate.

Ammonium heptamolybdate (referred to hereinafter as AHM) is a known intermediate for the preparation of molybdenum metal powder and of molybdenum-containing catalysts.

In principle, ammonium heptamolybdate (referred to hereinafter as AHM) is prepared via the dissolution of technical molybdenum oxides, which are obtained by roasting molybdenum sulphide concentrates, in water or alkaline solution. The resulting solution is, for example, purified via liquid-liquid extraction or using a solid ion exchange resin. The purified solution is generally concentrated by evaporation and, after the required pH has been established, for example by adding mineral acids, AHM is crystallized by means of cold crystallization.

In a further route, the prepurified ammonium molybdate solution is reprocessed by acidification to give an intermediate, for example ammonium polymolybdate. The intermediate is dissolved in ammoniacal solution under hot conditions, and AHM is subsequently crystallized by cooling.

A process for preparing AHM is described in SU-A-1,723, 042. The process consists in digesting technical molybdenum oxide with water and ammonia solution at pH 6.0-6.8, and obtaining a solution with a content of about 20-24% $MoO_3$. This solution is subsequently filtered through combined fabric and membrane filters at about 20-30° C. and concentrated by evaporation at about 50-70° C. down to an $MoO_3$ concentration of about 36-40%. Thereafter, the AHM product is crystallized by cooling. Disadvantages of this process are the high energy consumption in the concentration of the molybdenum solution, the high content of impurities in the AHM owing to the lack of a purification step for the removal of dissolved impurities, and the low product yield as a result of the molybdenum losses with the mother liquor.

U.S. Pat. No. 4,079,116 describes a further process for preparing AHM. This comprises the leaching and filtering of technical molybdenum oxide with water and the purification of this solution by means of an ion exchange process to free it of cationic impurities. Subsequently, the residue of the water leaching is combined with the purified solution and digested with ammonia solution. From the resulting solution, ADM is crystallized by means of an evaporative crystallization. After setting the pH, for example with carbon dioxide, the ADM mother liquor is finally conducted to the AHM cold crystallization. In a second embodiment of this patent, the solution of the ammoniacal digestion is concentrated by evaporation under reduced pressure at about 55° C. for concentration and setting of the pH, and then conducted to the AHM cold crystallization. A disadvantage in these processes is that an energy-intensive concentration of the molybdenum solution by evaporation is again carried out, and that the AHM product has high impurity contents, since the purification stage here does not enable the removal of anionic impurities and alkali metals. A further disadvantage of the process is that a high ammonia excess based on the AHM product is used, which has to be recovered by a complicated process.

The publication "The use of solvent extraction for the production and recovery of high-purity ammonium paramolybdate from normal alkali molybdate solution" (Journal of the Less-Common Metals (1974, 36 (112), 111-116) describes the preparation of AHM. In this process, technical molybdenum oxide is digested with sodium hydroxide solution, and the resulting sodium molybdate solution is purified by means of a liquid-liquid extraction. In the extraction, the molybdenum is taken up selectively by an amine-containing organic phase and, after a water wash, stripped with 15.7 molar ammonia solution in excess at a quantitative ammonia: molybdenum ratio (referred to hereinafter as $NH_3$:Mo ratio) of about 9.0. The resulting pure ammonium molybdate solution with 250 g/l of $MoO_3$ is concentrated by evaporation and sent to an AHM cold crystallization. A disadvantage of this process is again the high energy consumption of the concentration of the molybdenum content required here and of the setting of the $NH_3$:Mo ratio of 0.9 to 1.4 needed for the AHM crystallization. Moreover, the high ammonia excess based on the AHM product has to be recovered by a complicated process.

The article "Production of ammonium paramolybdate from nonstandard molybdenite concentrate by extraction" (Nauch. Tr., Irkutsk. Nauch.-Issled. Inst. Redk. Tsvet. Metal (1972), No. 27, 138-145) describes a process for preparing AHM. In this process, technical molybdenum oxide is digested with soda. The resulting sodium molybdate solution is acidified down to pH 1-2 and the molybdenum is extracted with trioctylamine. The molybdenum loading of the organic phase is about 140 g/l. The reextraction is effected using 15-20% ammonia solution, such that the stripping solution contains 180-200 g/l of Mo and an $NH_3$:Mo ratio of 4.3 to 5.8. By means of a subsequent acidification with a mineral acid, ammonium polymolybdate is crystallized and removed. Thereafter, the crystals are dissolved with ammonia solution and recrystallized to give AHM. A disadvantage of this process is that, again, no direct AHM cold crystallization from the stripping solution can be carried out, since the $NH_3$:Mo ratio of the solution has much too high a value therefor. In order to achieve the required ratio of 0.9 to 1.4, an ammonium polymolybdate intermediate is prepared by means of additional process steps and dissolved again. Here too, the high ammonia excess based on the AHM product has to be recovered by a complicated process.

BRIEF SUMMARY OF THE INVENTION

The invention relates to a process for preparing ammonium heptamolybdate, comprising the steps of:
i) adding a molybdenum-containing organic phase to a liquid-liquid reextraction apparatus of to a desorption apparatus and adding an ammonia-containing aqueous solution to this reextraction or desorption apparatus, and
ii) directly cold-crystallizing ammonium heptamolybdate by cooling the resulting reextraction or desorption solution.

It is an object of the present invention to provide a process which avoids the disadvantages of the known processes. In particular, it is an object of the invention to prepare a high-purity AHM without energy-intensive concentration and without a high ammonia excess, based on the AHM product, with fewer process steps.

DETAILED DESCRIPTION OF THE INVENTION

Figure 1:
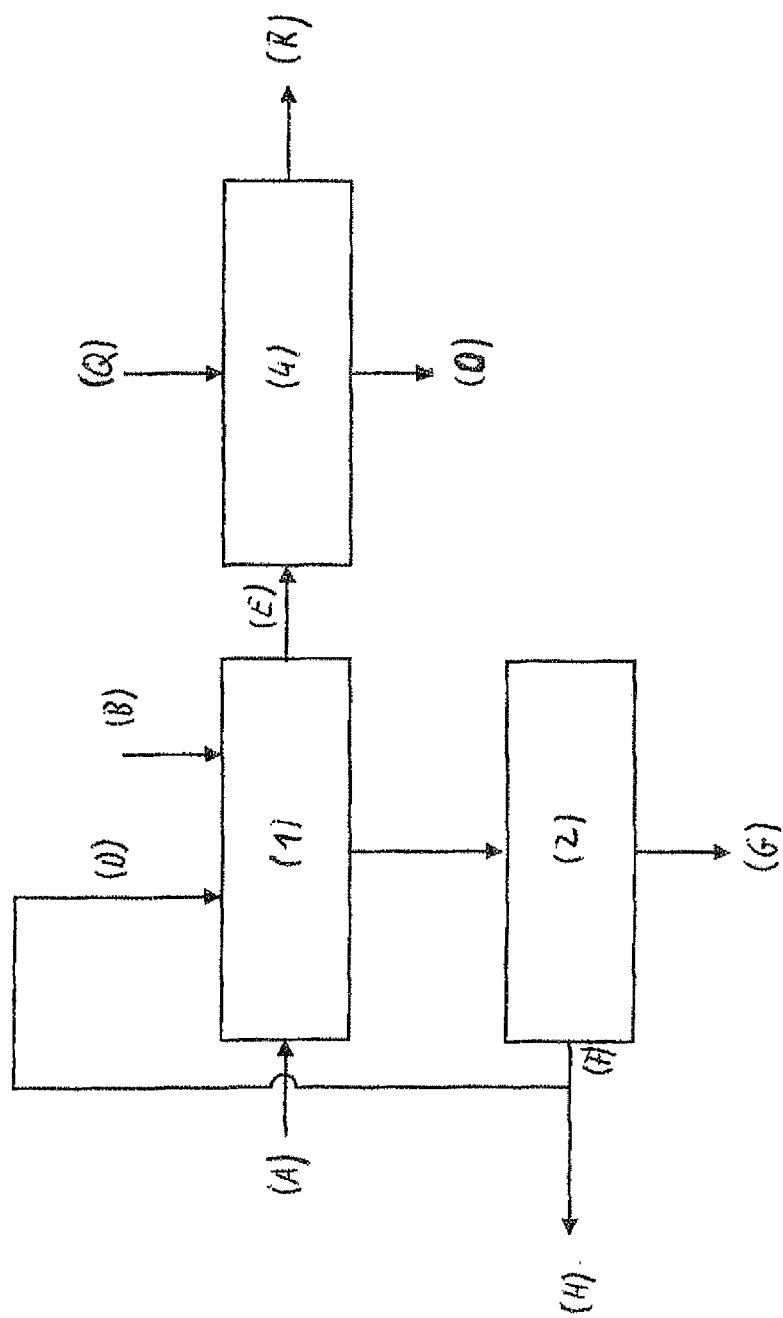
FIG. 1 illustrates one embodiment of the process according to the invention for preparing AHM (one-flow process, a liquid-liquid reextraction stage).

The prior art has to date not described any process for preparing high-purity AHM, in which AHM can be crystallized directly out of the stripping solution without concentration by evaporation and/or acidification or removal of the ammonia excess.

Surprisingly, a process has now been found, which allows a cleaner ammonium molybdate solution to be prepared, from which AHM can be prepared directly via a cold crystallization.

The invention is based on the surprising finding that, in the reextraction or desorption of a molybdenum-containing organic phase, liquid or solid ion exchanger, with an ammonia-containing solution, a reextraction or desorption solution with an $NH_3$:Mo ratio of 0.9 to 1.4 and a molybdenum concentration between 18-24% can be obtained, from which AHM can be crystallized by means of a cold crystallization directly without additional and energy-intensive intermediate steps.

In the case of performance of two or more reextraction steps connected in series, the reextraction yield is virtually 100% compared to the known processes with significantly lower ammonia consumption.

Recycling of the mother liquor from the AHM cold crystallization and use of 25% by weight ammonia solution for the reextraction of the organic phase laden with molybdenum achieves a very high AHM yield, based on the molybdenum content of the laden organic phase, of 96.5%. When the ammonia concentration of the ammonia-containing solutions is increased, the yield can be enhanced even further.

The present invention relates to a process for preparing ammonium heptamolybdate, comprising the steps of:
  i) adding a molybdenum-containing organic phase to a liquid-liquid reextraction apparatus or to a desorption apparatus and adding an ammonia-containing aqueous solution to this reextraction or desorption apparatus, and
  ii) directly cold-crystallizing ammonium heptamolybdate by cooling the resulting reextraction or desorption solution.

The idea of the process according to the invention consists in performing the reextraction or desorption of molybdenum from an organic phase, for example from liquid organic phases or from solid ion exchange resins, such that, in the case of achievable full reextraction or desorption, the resulting reextraction or desorption solution has a quantitative ratio of ammonia to molybdenum of 0.9 to 1.4, preferably 1.0 to 1.2, and a molybdenum concentration of 18 to 24% by weight of Mo, preferably 18.5 to 20.5% by weight of Mo, and high-purity AHM is crystallized directly from this solution by means of a cold crystallization.

At an $NH_3$:Mo ratio outside the range specified, pure-phase AHM does not crystallize out. Molybdenum concentrations above 24% by weight of Mo in the aqueous phase cause problems in the phase separation when liquid organic phases are used, or lead to the ion exchanger being blocked by crystallization when solid ion exchangers are used. Molybdenum concentrations below 18.0% by weight of Mo in the aqueous phase lead to a reduction in the crystallization yield.

In a preferred embodiment of the process according to the invention, the idea consists in using mother liquor of the cold crystallization for the reextraction or desorption.

The process according to the invention can be performed batchwise or preferably continuously.

The molybdenum-containing organic phase used in step i) may be products known per se.

The solid organic phases may be commercial anion exchange resins, for example tertiary or quaternary amines bound on a crosslinked polystyrene matrix, such as Lewatit MP 62 or Lewatit MP 500, which are laden with molybdenum in a manner known to those skilled in the art.

In step i), preference is given to using, as starting solutions, liquid organic phases consisting, for example, of 15% diisotridecylamine, 10 to 15% isodecanol and 70-75% of an aliphatic hydrocarbon mixture (e.g. ESCAID 120), which are laden in a manner known to those skilled in the art with 40 to 70 g/l of molybdenum, preferably 50 to 60 g/l of molybdenum.

Instead of secondary amines, it is also possible to use other bases such as tertiary amines, or else quaternary ammonium salts and other modifiers; instead of isodecanol, it is also possible to use other alcohols; it is also possible to use other hydrocarbon mixtures with different composition ratios.

The aqueous ammonia-containing solution used in step i) may be an aqueous ammonia solution. Preference is given to using an aqueous ammonia solution in combination with the mother liquor of the AHM cold crystallization which comprises molybdenum and ammonia.

The reextraction or desorption of the molybdenum can be carried out in one step or in a plurality of steps in reextraction apparatus which is composed of a mixing stage and a separating stage and is known to those skilled in the art, for example mixer-settler apparatus. Preference is given to effecting the reextraction or the desorption in two steps, in which case the resulting reextraction or desorption solutions are combined.

The reextraction solution or desorption solution typically has temperatures of 40 to 90° C., preferably of 55 to 65° C.

The reextracted organic phase is washed with water and recycled to the molybdenum loading.

In step ii) of the process according to the invention, the reextraction or desorption solution obtained in step i) is cooled, such that AHM crystallizes. The cold crystallization is performed such that the resulting mother liquor has a molybdenum concentration of 9.0 to 13% by weight, preferably 10.5 to 12.0% by weight. The performance of the cold crystallization is known to those skilled in the art.

Subsequently, the AHM is removed by, for example, filtration or centrifugation, and dried in a known manner.

A mother liquor obtained in the crystallization is heated preferably to 55-65° C. before use in step i) of the process.

The invention is described in the figures and the working examples which follow. A restriction to these examples and figures thereby is not intended.

The figures show:

FIG. 1: One embodiment of the process according to the invention for preparing AHM (one-flow process, a liquid-liquid reextraction stage)

Figure 2:
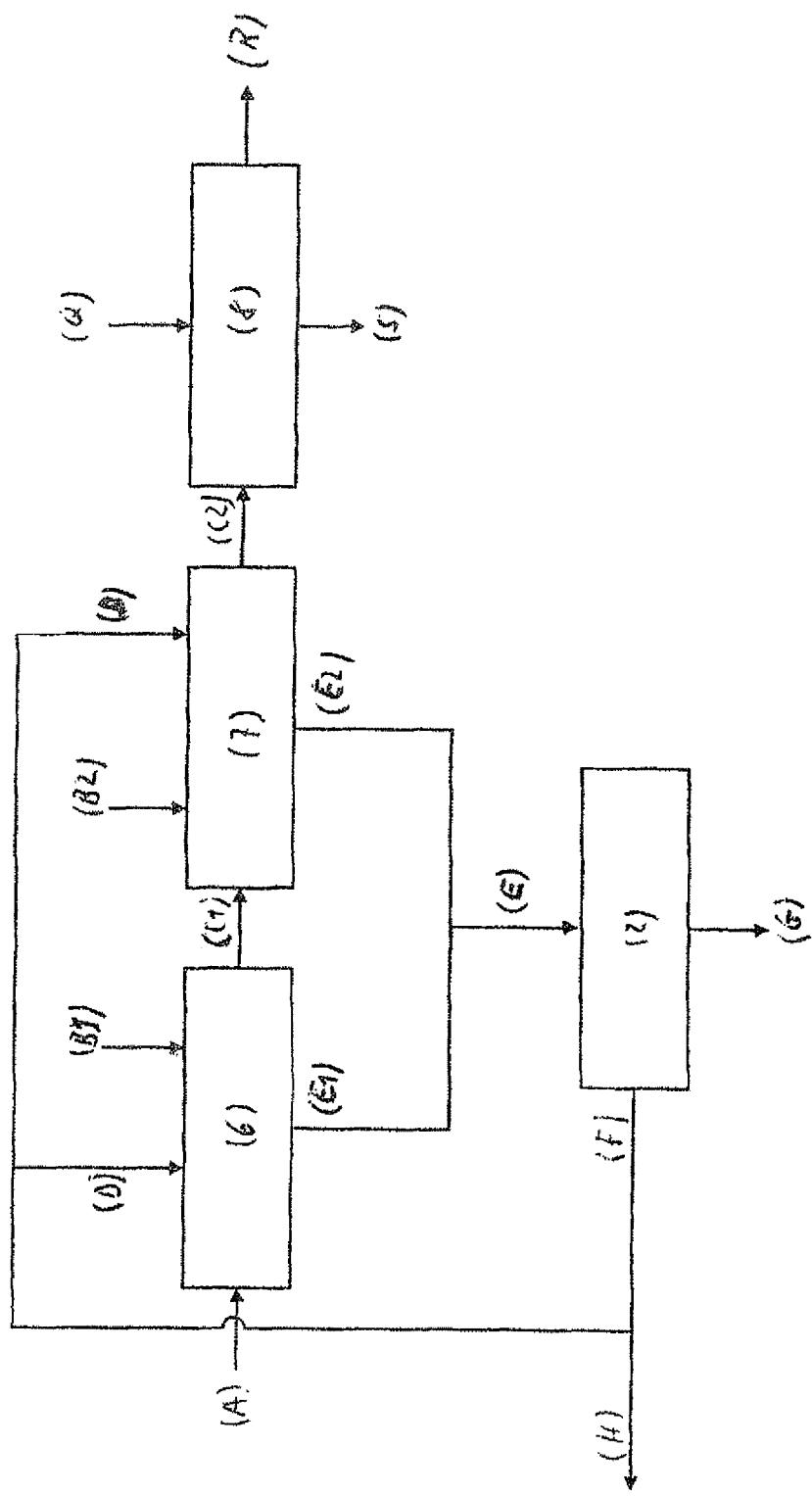
FIG. 2 illustrates a further embodiment of the process according to the invention for preparing AHM (one-flow process, two liquid-liquid reextraction stages).

FIG. 2: A further embodiment of the process according to the invention for preparing AHM (one-flow process, two liquid-liquid reextraction stages)

Figure 3:
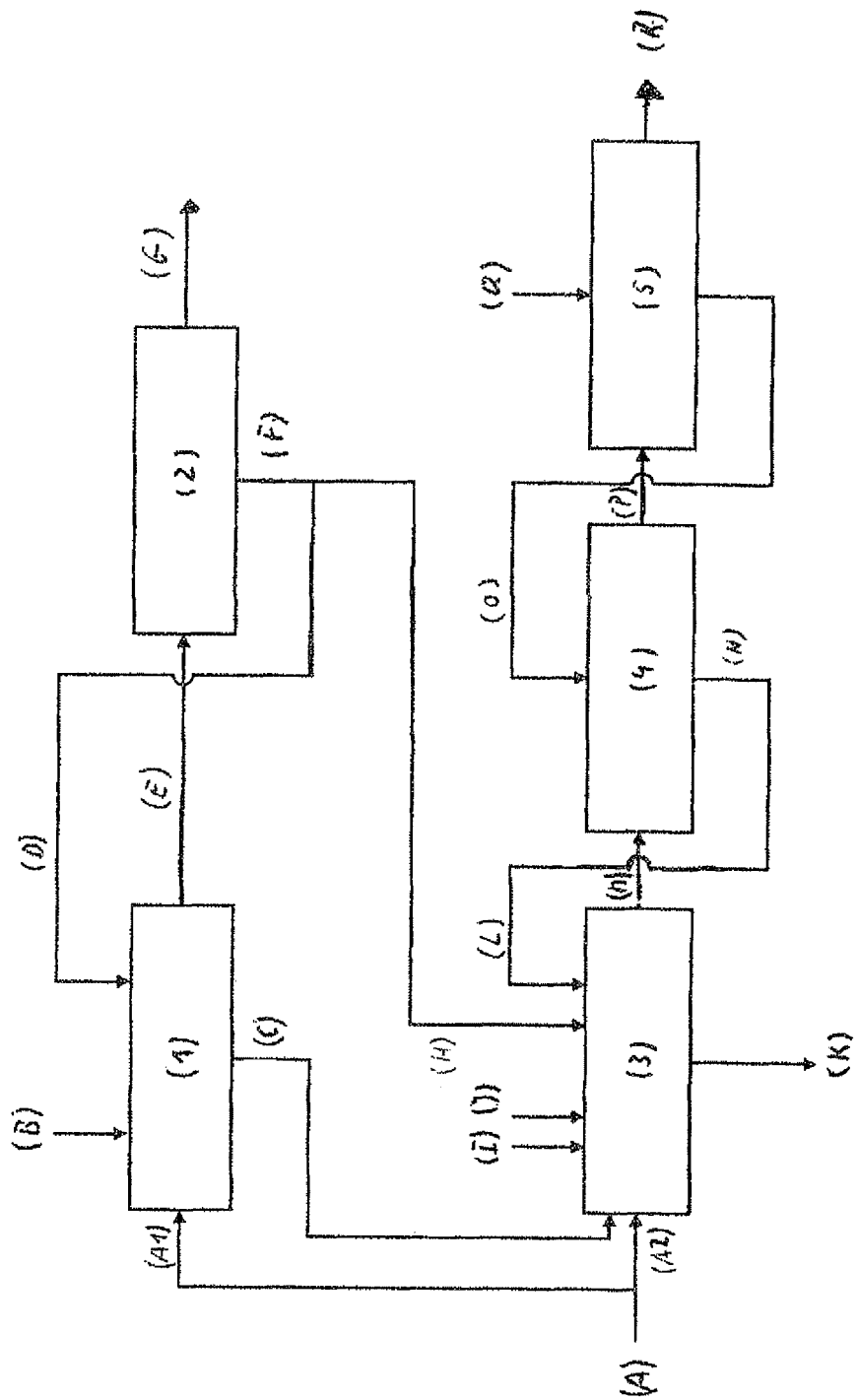
FIG. 3 illustrates a further embodiment of the process according to the invention for the selective preparation of AHM and ADM (sub-flow process).

FIG. 3: A further embodiment of the process according to the invention for the selective preparation of AHM and ADM (sub-flow process)

Example 1

One-Flow Process (2 Reextraction Stages)

The process described in this example is outlined in FIG. 2. This figure shows two reextraction stages (6,7), in which a liquid-liquid extraction is carried out. The reextraction stages (6,7) each consist of a stirred vessel which is not shown, in which an organic phase comprising dissolved molybdate with aqueous ammonia solution and with mother liquor from the AHM crystallization are mixed with one another with stirring, and removed from a downstream clarifying vessel ("settler") which is not shown, in which the aqueous phase and the organic phase separate under the action of gravity and are conducted out through different lines.

To prepare AHM, technical molybdenum oxide was digested with sodium hydroxide solution in a conventional manner. The resulting sodium molybdate solution was extracted at about pH 2.5 with a ditridecylamine-containing organic phase (referred to hereinafter as "OP"). Digestion and extraction are not shown in FIG. 2. The product of these operations was introduced through line (A) into the stirred vessel of the first reextraction stage (6). There, the molybdenum-laden OP was combined with mother liquor from the AHM crystallization via line (D) and with 25% aqueous ammonia solution via line (B1), and reextracted in the first reextraction stage (6). The metering rates were selected such that a ratio of $NH_3$:Mo (molar) of 1.15:1 and a molybdenum concentration of 19.55% by weight were established in the reextraction solution. The contents of the first stirred vessel were transferred continuously to a first settler, and the reextraction solution was fed via line (E1) to the cold crystallization (2).

The organic phase from the first settler was transferred via line (C1) into a second stirred vessel which is not shown and, together with a second settler which is not shown, formed the second reextraction stage (7). In the second stirred vessel, 25% aqueous ammonia solution was supplied via line (B2), and mother liquor from the AHM crystallization (2) via line (D). The metering rates were selected such that a ratio of $NH_3$:Mo (molar) of 2.13:1 and a molybdenum concentration of 18.5% by weight were established in the reextraction solution. The contents of the second stirred vessel were transferred continuously to a second settler, and the reextraction solution was likewise fed to the cold crystallization (2) via line (E2).

The organic phase from the second settler was fed via line (C2) to a scrubber (8), where it was washed in countercurrent with water supplied via line (Q) in order to completely remove remaining ammonia therefrom. The molybdenum-free organic solvent mixture was removed via line (R) and recycled into the process of molybdenum extraction. The ammonia was removed from the wash water removed by line (S), and the wash water was recycled into the process of molybdenum digestion.

Before the cold crystallization, the aqueous phases from line (E1) and from line (E2) were combined and fed to the cold crystallization (2) via line (E). The cold crystallization (2) consisted of a heatable stirred vessel which is not shown in detail and a suction filter for separating crystallized AHM product from the mother liquor, which is not shown. The AHM product (G) was discharged from the process. The mother liquor of the cold crystallization was removed via line (F). A portion of the AHM mother liquor was discharged from the process via line (H), and a further portion of the AHM mother liquor was recycled into the reextraction stages (6,7) via line (D). The AHM product yield was, based on the Mo content of the OP, 96.5%. In stage 1, the reextraction yield was 94.5%, with a total reextraction yield of 100%.

Example 2

One-Flow Process (1 Extraction Stage)

The process described in this example is outlined in FIG. 1. In this figure, only one reextraction stage (1) was used, in which a liquid-liquid extraction was carried out. The reextraction stage (1) consisted of a stirred vessel/settler combination as in Example 1.

Technical molybdenum oxide was, as described in Example 1, digested with sodium hydroxide solution in a conventional manner. The resulting sodium molybdate solution was extracted with a ditridecylamine-containing organic phase at approx. pH 2.5. The molybdenum-laden OP was introduced into reextraction stage (1) via line (A) and reextracted in the stirred vessel, which is not shown, of this reextraction stage (1) with mother liquor from the AHM crystallization (2) supplied via line (D) and aqueous ammonia solution supplied via line (B), such that a molybdenum concentration of 19.0% and an $NH_3$:Mo ratio of 1.20 were established in the reextraction solution. The reextraction solution was subsequently fed to the ARM cold crystallization (2), and the OP from reextraction stage (1) residually laden with approx. 3.0 g/l of Mo was fed via line (E) to a scrubber (4) and cleaned in countercurrent with water supplied via line (Q). After the wash, the OP was recycled to the extraction via line (R) and the water was removed from the scrubber via line (O).

The construction of the cold crystallization (2) corresponded to the cold crystallization of Example 1. The ARM product (G) was discharged from the process. The mother liquor of the cold crystallization was removed via line (F), a portion of the AHM mother liquor was discharged from the process via line (H), and a further portion of the ARM mother liquor was recycled into reextraction stage (1) via line (D). The ARM product yield was, based on the Mo content of the OP, 96.5%.

Example 3

Sub-Flow Process

The process described in this example is outlined in FIG. 3. In this figure, only one reextraction stage (1) was used, in which a liquid-liquid extraction was carried out. In addition to an apparatus for preparing AHM shown in the upper part of the figure, a stirred vessel (3) which forms part of an apparatus for preparing ADM is shown in the lower part. The reextraction stage (1) for the AHM process consisted, as in Example 1, of a stirred vessel/settler combination not shown.

Technical molybdenum oxide was, as described in Example 1, digested with sodium hydroxide solution in a conventional manner. The resulting sodium molybdate solution was extracted with a ditridecylamine-containing organic phase (OP) at approx. pH 2.5. A part-flow of the laden OP was introduced into the stirred vessel of the reextraction stage (1) via line (A1), and reextracted there with mother liquor from the AHM cold crystallization (2) with 11.66% Mo and an NH$_3$:Mo ratio of 1.55 supplied via line (D), and aqueous ammonia solution supplied via line (B), such that a molybdenum concentration of 19.24% and an NH$_3$:Mo ratio of 1.20 were established in the reextraction solution removed via line (E). The reextraction yield was approx. 94.5%.

The reextraction solution was subsequently supplied via line (E) to the AHM cold crystallization (2) and crystallized at 15-20° C. The AHM product (G) was discharged from the process. The AHM mother liquor was removed via line (F), and a portion of the AHM mother liquor was recycled via line (D) into the reextraction process of the AHM preparation. A further portion of the AHM mother liquor was supplied via line (H) to a stirred vessel (3) which formed part of a plant for conventional reextraction for the preparation of ADM.

In this stirred vessel (3), the residually laden OP from the reextraction process of the AHM preparation was combined with the second OP sub-flow supplied by line (A2). In this part of the plant, the molybdenum was reextracted in a conventional manner for the preparation of ADM. To this end, a portion of the AHM mother liquor (3.3% of the total amount of mother liquor), together with aqueous ammonia solutions supplied via lines (I, J, L), was added to the conventional reextraction. The resulting reextraction solution was removed via line (K) and reprocessed by means of an evaporative crystallization not shown to give ammonium dimolybdate (ADM). The OP from stirred vessel (3) was conducted through scrubbers (4,5) and freed there of ammonia in countercurrent with water conducted via lines (Q, O). The scrubbers (4,5) were connected to one another by line (P). The purified OP was removed from scrubber (5) via line (R) and recycled into the process.

The AHM product yield was, based on the Mo content of the OP sub-flow, 91.5%.

With the method illustrated, it was possible, proceeding from an OP starting solution, to prepare both AHM and ADM in different quantitative ratios. This was established by adjusting the sizes of the OP sub-flows in lines (A1, A2).

The invention claimed is:

1. A process for preparing ammonium heptamolybdate, comprising the steps of:
   i) adding a molybdenum-containing organic phase to a liquid-liquid reextraction apparatus or to a desorption apparatus and adding an ammonia-containing aqueous solution to this reextraction or desorption apparatus, the amount of ammonia is selected such that, after the reextraction or the desorption, a quantitative ratio of ammonia to molybdenum of 0.9 to 1.4, is established in the resulting reextraction or desorption solution and
   ii) directly cold-crystallizing ammonium heptamolybdate by cooling the resulting reextraction or desorption solution.

2. The process according to claim 1, wherein the amount of ammonia is selected such that, after the reextraction or the desorption, a quantitative ratio of ammonia to molybdenum of 1.0 to 1.2, is established in the resulting reextraction or desorption solution.

3. The process according to claim 1, wherein mother liquor from the cold crystallization is used for the reextraction or desorption in step i).

4. The process according to claim 2, wherein the mother liquor from the cold crystallization is heated to 55-65° C. before use in step i).

5. The process according to claim 1, wherein an amount of mother liquor and/or of ammonia solution supplied to the reextraction or desorption is selected such that a molybdenum concentration of 18.0 to 24.0% by weight, is established in the resulting reextraction or desorption solution.

6. The process according to claim 1, wherein an amount of mother liquor and/or of ammonia solution supplied to the reextraction or desorption is selected such that a molybdenum concentration of 18.5 to 20.5% by weight, is established in the resulting reextraction or desorption solution.

7. The process according to claim 1, wherein the ammonia-containing aqueous solution is added in at least two steps.

8. The process according to claim 1, wherein the molybdenum is reextracted or desorbed in two steps, the resulting reextraction or desorption solutions being combined before the cold crystallization.

9. The process according to claim 1, wherein the molybdenum-containing organic phase used is a molybdenum-containing liquid organic phase.

10. The process according to claim 1, wherein the cold crystallization is performed in such a way that the molybdenum concentration of the mother liquor is between 9.0 and 13% by weight.

11. The process according to claim 1, wherein the cold crystallization is performed in such a way that the molybdenum concentration of the mother liquor is between 10.5 and 12.0% by weight.

12. The process according to claim 1, wherein the preparation of ammonium heptamolybdate in steps i) to ii) is coupled to a preparation of ammonium dimolybdate by supplying a predetermined proportion of the molybdenum-containing organic phase to step i) and feeding the remaining proportion of the molybdenum-containing organic phase to a reextraction stage for preparing ammonium dimolybdate.

13. The process according to claim 1, wherein the molybdenum compound is digested with sodium hydroxide solution.

14. The process according to claim 13, wherein after the molybdenum compound is digested with said sodium hydroxide solution, a resulting sodium molybdate solution is formed and the solution is extracted with an organic phase.

15. The process according to claim 14, wherein the organic phase comprises diisotridecylamine.

* * * * *

UNITED STATES PATENT AND TRADEMARK OFFICE
CERTIFICATE OF CORRECTION

PATENT NO. : 8,431,107 B2
APPLICATION NO. : 12/524976
DATED : April 30, 2013
INVENTOR(S) : Stoller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this
Eighth Day of September, 2015

Michelle K. Lee
*Director of the United States Patent and Trademark Office*